United States Patent
Bickham et al.

(10) Patent No.: US 11,428,637 B2
(45) Date of Patent: Aug. 30, 2022

(54) MULTI-LASER RAMAN SPECTROSCOPY SYSTEM AND METHODS

(71) Applicant: CORNING INCORPORATED, Corning, NY (US)

(72) Inventors: Scott Robertson Bickham, Corning, NY (US); Martin Hempstead, Painted Post, NY (US); Richard Lynton Wiggins, Keene, NH (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/036,429

(22) Filed: Sep. 29, 2020

(65) Prior Publication Data

US 2021/0102898 A1 Apr. 8, 2021

Related U.S. Application Data

(60) Provisional application No. 62/909,358, filed on Oct. 2, 2019.

(51) Int. Cl.
G01N 21/65 (2006.01)

(52) U.S. Cl.
CPC ... *G01N 21/65* (2013.01); *G01N 2201/06113* (2013.01); *G01N 2201/0826* (2013.01)

(58) Field of Classification Search
CPC ......... G01N 21/65; G01N 2201/06113; G01N 2201/0826; G01J 3/44
See application file for complete search history.

(56) References Cited

U.S. PATENT DOCUMENTS

| | | | |
|---|---|---|---|
| 4,239,330 | A | 12/1980 | Ashkin |
| 4,239,331 | A | 12/1980 | Aoyama |
| 4,303,303 | A | 12/1981 | Aoyama |
| 4,322,126 | A | 3/1982 | Minowa et al. |
| 4,634,239 | A | 1/1987 | Buhrer |
| 5,361,315 | A | 11/1994 | Lewis et al. |

(Continued)

FOREIGN PATENT DOCUMENTS

| WO | 2010/083484 A2 | 7/2010 |
|---|---|---|
| WO | 2019/157266 A1 | 8/2019 |

OTHER PUBLICATIONS

"Raman Spectroscopy: Multi-wavelength excitation in Raman spectroscopy", available online at <https://www.biopticsworld.com/articles/print/volume-8/issue-3/features/raman-spectroscopy-multi-wavelength-excitation-in-raman-spectroscopy.html>, Aug. 6, 2015, 7 pages.

(Continued)

*Primary Examiner* — Maurice C Smith
(74) *Attorney, Agent, or Firm* — Annie Morgan

(57) ABSTRACT

A Raman spectroscopy system is provided. The spectroscopy system includes an optical switch including a pump inlet, a return outlet, a plurality of pump outlets, and a plurality of return inlets. The spectroscopy system includes a plurality of radiation sources optically coupled to the pump inlet of the optical switch, and a detector optically coupled to the return outlet of the optical switch. The spectroscopy system further includes a plurality of probes, each probe optically connected to at least one of the plurality of pump outlets of the optical switch by at least one excitation fiber and optically coupled to one of the return inlets of the optical switch by at least one emission fiber.

17 Claims, 3 Drawing Sheets

(56) References Cited

U.S. PATENT DOCUMENTS

| | | |
|---|---|---|
| 6,897,951 B2 | 5/2005 | Womble et al. |
| 9,068,883 B2 * | 6/2015 | Volodin .................... G01J 3/10 |
| 2007/0285658 A1 * | 12/2007 | Claps .................... G01J 3/2889 |
| | | 356/301 |
| 2012/0089030 A1 | 4/2012 | Guze et al. |
| 2012/0099102 A1 | 4/2012 | Bello |
| 2017/0173275 A1 | 6/2017 | Anderson et al. |

OTHER PUBLICATIONS

International Search Report and Written Opinion of the International Searching Authority; PCT/US2020/053183; dated Jan. 12, 2021; 11 Pages; European Patent Office.

McCain et al., "Multi-excitation Raman spectroscopy technique for fluorescence rejection," Optics Express, vol. 16, 2008, pp. 10975-10991.

* cited by examiner

MULTI-LASER RAMAN SPECTROSCOPY SYSTEM AND METHODS

CROSS REFERENCE TO RELATED APPLICATIONS

This application claims the benefit of priority under 35 U.S.C § 120 of U.S. Provisional Application Ser. No. 62/909,358 filed on Oct. 2, 2019, the content of which is relied upon and incorporated herein by reference in its entirety.

FIELD

The present disclosure generally relates to optical devices and, more particularly, to a multi-laser Raman spectroscopy system.

BACKGROUND

Raman spectroscopy is an analytical technique that uses light scattering to determine identities and concentrations of various molecules in a substance by illuminating the substance with monochromatic light and then measuring the individual wavelengths and their intensities in the scattered light. This analytical tool is commonly used in chemistry to identify types and concentrations of the molecules based on their structural fingerprints, and is suitable for analyzing aqueous and other liquid environments as well as for analyzing solids, gels, gases and powders. Raman spectroscopy is a technique that is based on the vibrational and rotational modes in a system. For example, in a typical Raman spectroscopy system, a sample is illuminated with a laser that optically excites the molecules in the sample, and a small fraction of the light is elastically scattered at wavelengths that are slightly lower or higher than the excitation wavelength. This shift in frequency, if the final state is lower in energy, is called a Stokes shift and, if the scattered photon is shifted to a higher frequency, is called an anti-Stokes shift.

Optical switches are conventionally used for a variety of applications including fiber optic communications. Such switches are used to direct light from a desired optical input to a desired optical output. 1×N switches for example make optical connections between a common port and any one of N ports where "N" is an integer greater than 1. Conventional optical switches may include, for example, microelectromechanical systems (MEMs) and micromechanical systems based on moving prisms or moving optical fibers. Commercial examples of micromechanical switches include the LightBend™ series manufactured by Agiltron (Woburn, Mass., USA). Raman spectroscopy is an example of an application which can utilize fiber optical fibers to transmit and receive light. International Patent Application No. PCT/US19/17190, the content of which is incorporated herein by reference, shows an optical switch used in a Raman spectroscopy system.

Raman spectroscopy systems conventionally include probes that facilitate measuring Raman spectra of samples remote from a light source and a detector. The probe is optically connected to the light source through a first optical fiber (the "pump" or "excitation" fiber) and optically connected to the detector through a second optical fiber (the "receive," "return," or "emission" fiber). Often the probe contains optical components including a narrow bandpass (or "laser clean-up") filter centered at the frequency of the laser and an edge, notch or high-pass filter that selectively rejects the light that is elastically scattered at the laser frequency. A Raman probe is often used to couple the pump and receive fibers to/from the sample, and these typically incorporate the optical filters, as discussed in U.S. Pat. No. 6,897,951 for example.

Probes with such optical components are convenient for Raman spectroscopy systems with a single probe or with a limited number of probes. However, as the number of probes in the Raman spectroscopy system increases, with each probe including its own set of optical components, the overall cost of the system increases as well.

Typical Raman spectrometers use a single laser that operates at a specific wavelength, and are designed to measure one sample of one location in a sample. To measure a different sample or a different location in the same sample, the Raman probe assembly has to be manually moved before a second measurement can be taken. As disclosed in International Patent Application No. PCT/US19/17190, a mechanical switch can be used in combination with the pump and probe filters located either inside the switch or in filter modules located between the switch and the spectrometer.

However, there is a need for a Raman spectroscopy system that can excite a sample at more than one wavelength to overcome the fluorescence or luminescence issues that plague many Raman measurement systems.

SUMMARY

According to an embodiment of the present disclosure, a Raman spectroscopy system is provided. The spectroscopy system includes an optical switch including a pump inlet, a return outlet, a plurality of pump outlets, and a plurality of return inlets. The spectroscopy system includes a plurality of radiation sources optically coupled to the pump inlet of the optical switch and a detector optically coupled to the return outlet of the optical switch. The spectroscopy system further includes a plurality of probes, each probe optically connected to at least one of the plurality of pump outlets of the optical switch by at least one excitation fiber and optically coupled to one of the return inlets of the optical switch by at least one emission fiber.

In certain aspects, embodiments of the invention are directed to a Raman spectroscopy system comprising an optical switch comprising a pump inlet, a return outlet, a plurality of pump outlets, and a plurality of return inlets; a plurality of radiation sources optically coupled to the pump inlet of the optical switch; a detector optically coupled to the return outlet of the optical switch; and a plurality of probes, each probe optically connected to at least one of the plurality of pump outlets of the optical switch by at least one excitation fiber and optically coupled to one of the return inlets of the optical switch by at least one emission fiber.

In an embodiment, the spectroscopy system further comprises at least one pump filter module optically coupled between the plurality of radiation sources and the pump outlets of the optical switch.

In an embodiment, the spectroscopy system further comprises a return filter module optically coupled between the detector and the return inlets of the optical switch.

In an embodiment, the optical switch comprises a pump optical switch and a return optical switch, wherein the pump optical switch comprises the pump inlet and the plurality of pump outlets, and wherein the return optical switch comprises the plurality of return inlets and the return outlet.

In an embodiment, the at least one pump filter module comprises a housing disposed between the plurality of radiation sources and the pump inlet of the optical switch.

In an embodiment, the return filter module comprises a housing disposed between the detector and the return outlet of the optical switch.

In an embodiment, the at least one pump filter module comprises a plurality of pump filter modules.

In an embodiment, each pump filter modules of the plurality of pump filter modules is optically coupled to one of the plurality of radiation sources between the plurality of radiation sources and the plurality of pump outlets of the optical switch.

In an embodiment, the spectroscopy system further comprises a pump multiplexer optically coupled between the plurality of pump filter modules and the plurality of pump outlets of the optical switch.

In an embodiment, the plurality of radiation sources comprises a plurality of lasers. In an embodiment, the laser has an output wavelength of between about 200 nm and about 1500 nm. In an embodiment, the laser has an output wavelength of between about 500 nm and about 850 nm, between about 515 nm and about 800 nm, or between about 530 nm and about 790 nm. In an embodiment, the plurality of lasers comprises a first laser with an output wavelength of about 532 nm and a second laser with an output wavelength of about 785 nm.

In an embodiment, the pump filter module comprises a band-pass filter disposed between a collimator and a focusing lens.

In an embodiment, the pump filter module further comprises a second focusing lens and wherein the collimator is disposed between the band-pass filter and the second focusing lens.

In an embodiment, the return filter module comprises a filter disposed between a collimator and a focusing lens.

In an embodiment, the filter is at least one of a long-pass filter, a notch filter, and an edge filter.

In an embodiment, the spectroscopy system further comprises a plurality of return filter modules optically coupled between the detector and the return inlets of the optical switch.

In an embodiment, the spectroscopy system further comprises a return multiplexer optically coupled between the return outlet and the plurality of return filter modules.

In an embodiment, the plurality of return filter modules comprises a first return filter module and a second return filter module, the first return filter module comprising at least one of a long-pass filter, a notch filter, and an edge filter, and the second return filter module comprising at least one of a long-pass filter, a notch filter, and an edge filter.

In an embodiment, the first return filter module comprises a different type of filter than the second return filter module.

In an embodiment, the return filter module further comprises a second focusing lens and wherein the collimator is disposed between the long-pass filter and the second focusing lens.

In an embodiment, the spectroscopy system further comprises an optical fiber bundle having a plurality of the emission fibers around the circumference of the at least one excitation fiber. In an embodiment, the optical fiber bundle comprises 2 or more emission fibers. In an embodiment, the optical fiber bundle comprises between about 2 and about 10 emission fibers.

In an embodiment, the detector comprises a charged coupled device (CCD) based sensor.

In an embodiment, the spectroscopy system further comprises a controller.

In an embodiment, the controller is configured to communicate a switch control signal to the optical switch, and wherein in response to the switch control signal, the optical switch either (a) forms a connection between the pump inlet and at least one of the plurality of pump outlets, or (b) forms a connection between at least one of the plurality of return inlets and the return outlet.

In an embodiment, the controller is configured to communicate a source control signal to at least one of the plurality of radiation sources, and wherein in response to the source control signal, the at least one of the plurality of radiation sources is controlled.

In an embodiment, the controller is configured to communicate a pump multiplex control signal to the pump multiplexer, and wherein in response to the pump multiplex control signal, the pump multiplexer combines radiation from at least two radiation sources into a single pump signal to the pump inlet.

In an embodiment, the controller is configured to communicate a return multiplex control signal to the return multiplexer, and wherein in response to the return multiplex control signal, the return multiplexer separates a signal from the return outlet into signals for the plurality of return filter modules.

In an embodiment, radiation from the plurality of radiation sources is delivered to the optical switch through the pump inlet and further delivered out of at least one of the plurality of pump outlets to at least one of the plurality of probes through at least one of the excitation fibers.

In an embodiment, radiation scattered by the sample is collected in the one of the plurality of probes and delivered to the optical switch through one of the plurality of return inlets and further delivered out of the return outlet to the detector.

In an embodiment, the spectroscopy system further comprises a plurality of detectors optically coupled to the plurality of return filter modules.

In an embodiment, the system is configured to analyze, via the plurality of probes, one or more samples at a plurality of locations using at least one of the plurality of radiation sources.

In an embodiment, the system is configured to perform Raman spectroscopy of a sample using two or more of the plurality of radiation sources.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The disclosure will be understood more clearly from the following description and from the accompanying figures, given purely by way of non-limiting example, in which.

DETAILED DESCRIPTION

Figure 1A:
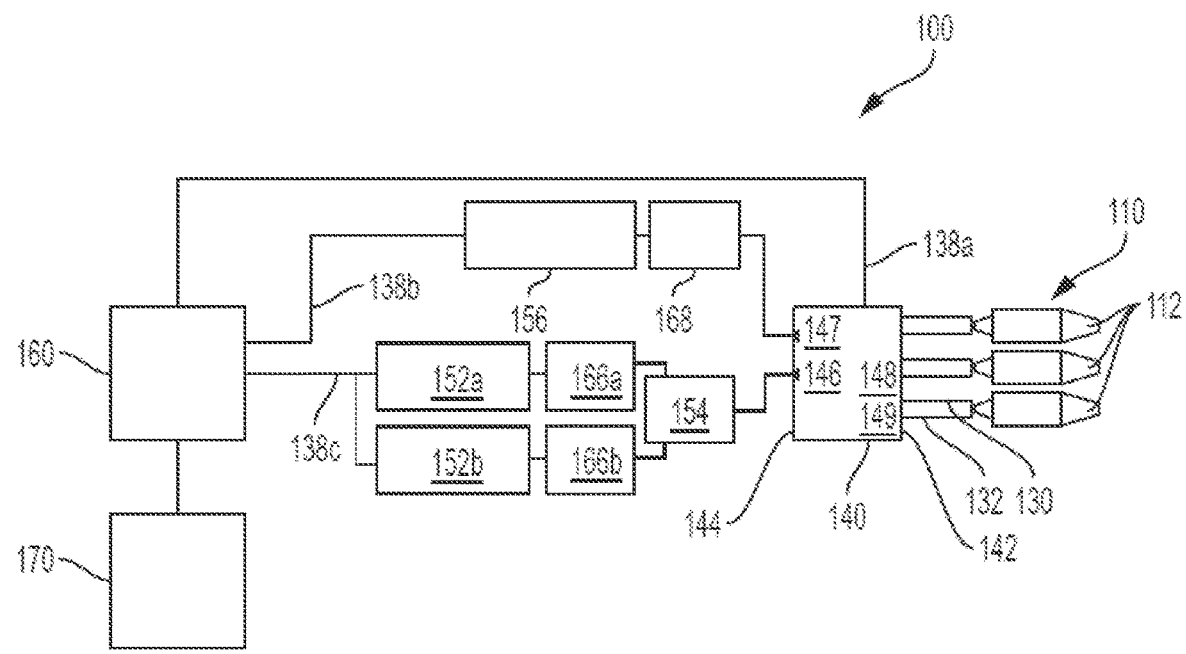
FIG. 1A illustrates a Raman spectroscopy system in accordance with embodiments of the present disclosure.

Reference will now be made in detail to the present embodiment(s), an example(s) of which is/are illustrated in the accompanying drawings. Whenever possible, the same reference numerals will be used throughout the drawings to refer to the same or like parts.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

As used herein, "have," "having," "include," "including," "comprise," "comprising" or the like are used in their open-ended sense, and generally mean "including, but not limited to."

All scientific and technical terms used herein have meanings commonly used in the art unless otherwise specified. The definitions provided herein are to facilitate understanding of certain terms used frequently herein and are not meant to limit the scope of the present disclosure.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments.

To measure a sample with a different excitation wavelength in a Raman spectroscopy system, a second laser can be coupled to the sample using a second Raman probe, since the laser clean-up filter inside the Raman probe only transmits light in a very narrow frequency window. Embodiments of this disclosure include Raman spectroscopy systems that can obtain Raman spectra with different excitation wavelengths (e.g., 532 and 785 nm) from a sample, or from more than one sample, or at multiple locations of a sample. A specific application is the measurement of analyte (e.g., lactate and glucose) concentrations in the cell culture vessel stacks used by the pharmaceutical industry. Embodiments of this disclosure also enable excitation of a sample at more than one wavelength to overcome the fluorescence or luminescence issues that plague many Raman measurement systems. By using spectra measured at different wavelengths to subtract noise resulting from fluorescence and luminescence, sensitivity can be improved. This can be achieved while reducing cost and complexity of the multi-laser system by using fewer sets of optical filters and, in some embodiments, only one detector. According to embodiments of this disclosure, such a Raman spectroscopy system can be accomplished practically and economically.

Embodiments of the present disclosure provide Raman spectroscopy systems including an optical switch including a pump inlet optically coupled to a plurality of radiation sources and a return outlet optically coupled to a detector. The optical switch further includes a plurality of pump outlets optically coupled to a plurality of probes by at least one excitation fiber and a plurality of return inlets optically coupled to a plurality of probes by at least one emission fiber. According to some embodiments, the optical switch can include a first side having the pump inlet and the return outlet, and a second side having the plurality of pump outlets and the plurality of return inlets.

The spectroscopy systems described herein may further include at least one pump filter module optically coupled to and/or disposed between the plurality of radiation sources and the plurality of pump outlets such that all radiation delivered from the plurality of radiation sources passes through a pump filter module prior to being delivered to the probes. According to some embodiments, a separate pump filter module can be provided for each radiation source of the plurality of radiation sources. In some embodiments, for example, each pump filter module is optically coupled to one of the plurality of radiation sources between the radiation sources and the plurality of pump outlets of the optical switch. Additionally, the spectroscopy systems described herein also include a return filter module disposed between the detector and the plurality of return inlets such that all radiation delivered from the probes passes through the return filter module prior to being delivered to the detector. The spectroscopy systems described herein advantageously allow for filtering of radiation delivered to a plurality of probes and filtering of radiation delivered from a plurality of probes without providing conventional probe optical components in each of the plurality of probes. Thus, the systems as described herein reduce the costs associated with analysis of multiple samples with multiple probes or of multiple portions of a sample with multiple probes.

According to some embodiments of this disclosure, a Raman spectroscopy system includes one or more multiplexers optically coupled to and/or disposed between a plurality of pump filter modules and a plurality of pump outlets of the optical switch. Similarly, some embodiments include one or more multiplexers optically coupled to and/or disposed between the return outlet and the plurality of return filter modules.

FIGS. 1A-1B and 2A-2B show Raman spectroscopy systems in accordance with embodiments of the present disclosure. The system 100 shown in FIG. 1A includes a plurality of probes 110 and a plurality of optical fibers 130, 132 optically connecting each of the plurality of probes 110 to a first side 142 of an optical switch 140. For each of the plurality of probes 110, at least one excitation fiber 130 optically connects the probe 110 to a pump outlet 148 on the first side 142 of the optical switch 140 and at least one emission fiber 132 optically connects the probe 110 to a return inlet 149 on the first side 142 of the optical switch 140. The first side 142 of the optical switch 140 includes a plurality of pump outlets 148 and a plurality of return inlets 149. Multiple radiation sources 152a, 152b are optically connected, each through a pump filter module 166a and 166b, respectively, to a pump inlet 146 on a second side 144 of the optical switch 140 and a detector 156 is optically connected, through a return filter module 168, to a return outlet 147 on the second side 144 of the optical switch 140. The system 100 further includes a controller 160 and a computing system 170. In the embodiment of FIG. 1A, the system 100 includes a pump multiplexer 154 optically coupled between the plurality of pump filter modules 166a, 166b and the pump inlet 146. The pump multiplexer 154 is arranged to combine the filtered pump lasers from the plurality of radiation sources 152a and 152b into a single pump fiber connected to the pump inlet 146.

Figure 1B:
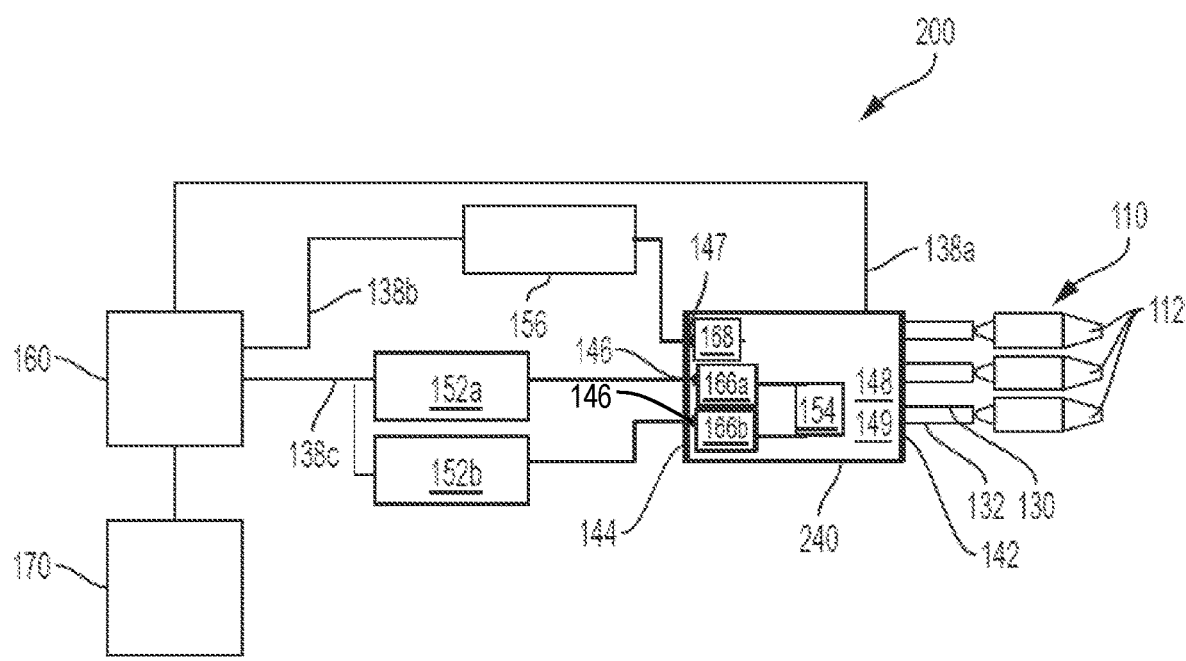
FIG. 1B illustrates a Raman spectroscopy system in accordance with embodiments of the present disclosure.

The spectroscopy system 200 shown in FIG. 1B includes similar system components as system 100 and differs from system 100 in that it includes optical switch 240. Optical switch 240 includes pump filter modules 166a, 166b disposed within the optical switch 240 between the pump inlet 146 and the plurality of pump outlets 148. Optical switch 240 also includes return filter module 168 disposed within the optical switch 240 between the return outlet 147 and the plurality of return inlets 149. As such, in system 200, the radiation sources 152a, 152b are optically connected directly to the pump inlet 146. The system 100 further includes a controller 160 and a computing system 170. In the embodiment of FIG. 1B, the system 200 includes a pump multiplexer 154 within the optical switch 240 and optically coupled between the plurality of pump filter modules 166a, 166b and the pump outlet 148. The pump multiplexer 154 is arranged to combine the filtered pump lasers from the plurality of radiation sources 152a and 152b, which is sent to the pump outlets 148.

Figure 2A:
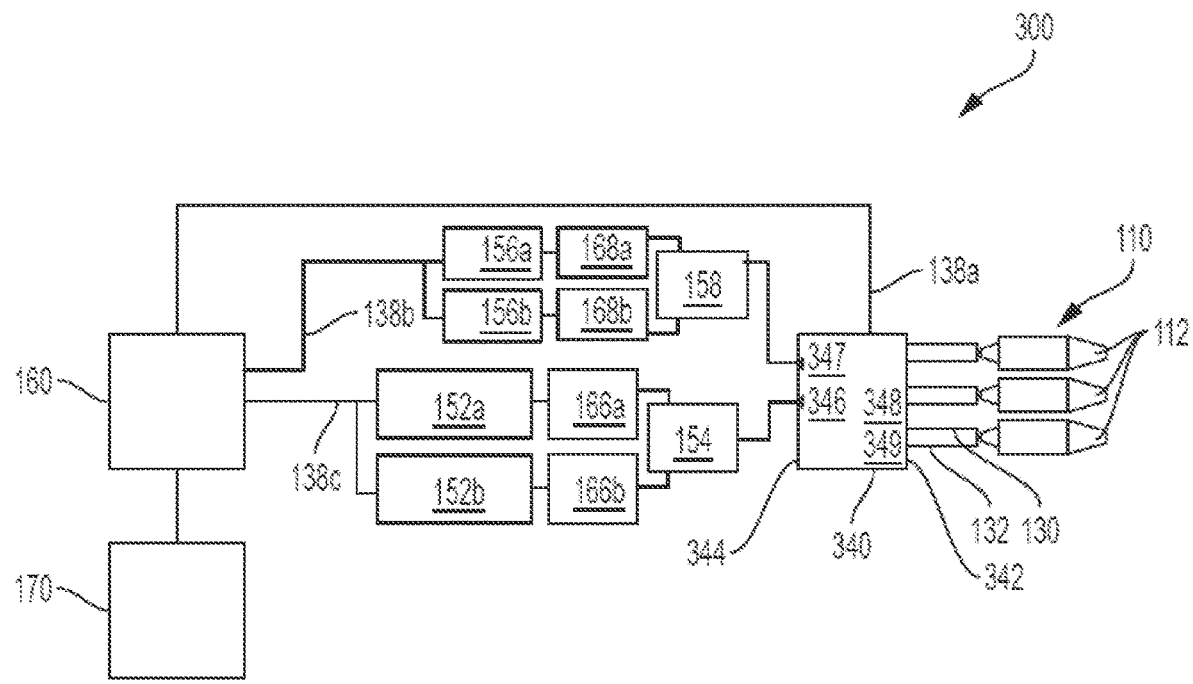
FIG. 2A illustrates a Raman spectroscopy system in accordance with embodiments of the present disclosure.

The spectroscopy system 300 shown in FIG. 2A includes a plurality of probes 110, an optical switch 340, a plurality of radiation sources 152a, 152b, and a plurality of detectors 156a, 156b. For each of the plurality of probes 110, at least one excitation fiber 130 optically connects the probe 110 to a pump outlet 348 on the first side 342 of the optical switch 340 and at least one emission fiber 132 optically connects the probe 110 to a return inlet 349 on the first side 342 of the optical switch 340. The first side 342 of the optical switch 340 includes a plurality of pump outlets 348 and a plurality of return inlets 349. The radiation sources 152a and 152b are optically connected, through pump filter modules 166a and 166b, respectively, to a pump inlet 346 on a second side 344 of the optical switch 340 and the detectors 156a and 156b are optically connected, through return filter modules 168a and 168b, respectively, to a return outlet 347 on the second side 344 of the optical switch 340. The system 100 further includes a controller 160 and a computing system 170. In the embodiment of FIG. 2A, the system 300 includes a pump multiplexer 154 optically coupled between the plurality of pump filter modules 166a, 166b and the pump inlet 346. The pump multiplexer 154 is arranged to combine the filtered pump lasers from the plurality of radiation sources 152a and 152b into a single pump fiber connected to the pump inlet 346. The system 300 further includes a return multiplexer 158 optically coupled between the return outlet 347 and the return filter modules 168a, 168b of the plurality of detectors 156a, 156b. The return multiplexer is arranged to separate return signals from the plurality of probes 110 via the return outlet 347 and send those separated signals to the return filter modules 168a, 168b, and the detectors 156a, 156b.

Figure 2B:
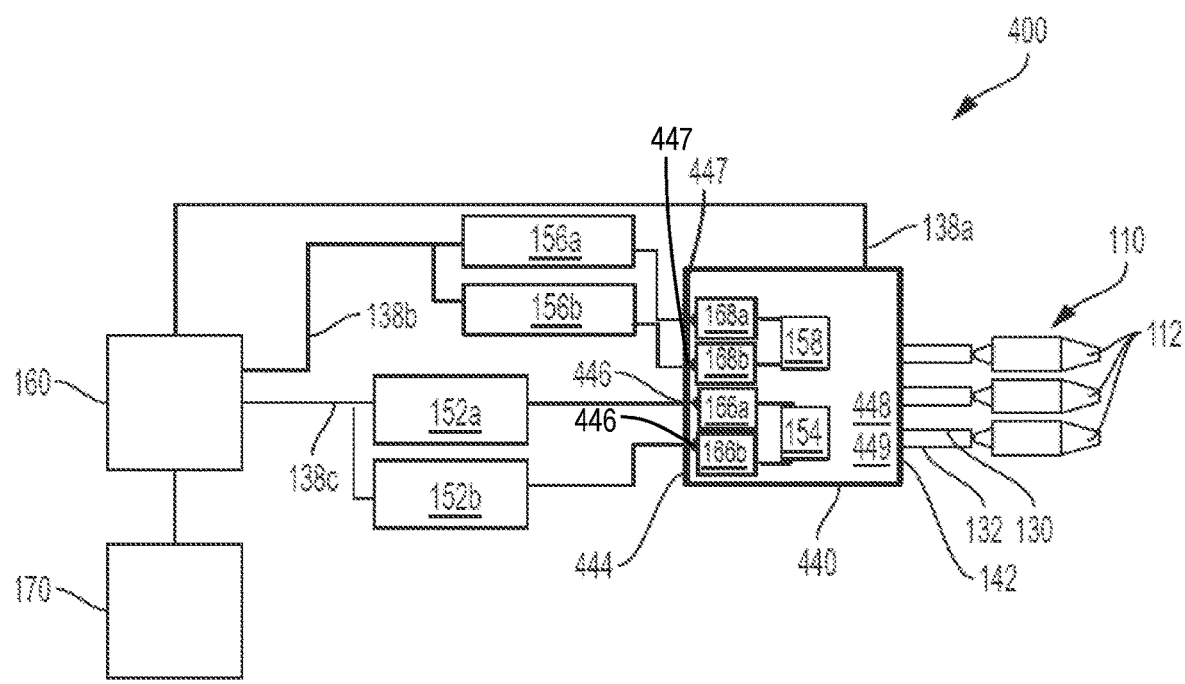
FIG. 2B illustrates a Raman spectroscopy system in accordance with embodiments of the present disclosure.

The spectroscopy system 400 shown in FIG. 2B includes similar system components as system 300 and differs from system 300 in that it includes optical switch 440. Optical switch 440 includes pump filter modules 166a and 166b disposed within the optical switch 440 between the pump inlet 446 and the plurality of pump outlets 448. Optical switch 440 includes return filter modules 168a and 168b disposed within the optical switch 440 between the return outlet 447 and the plurality of return inlets 449. As such, in system 400, the radiation sources 152a and 152b are optically connected directly to the pump inlet 446. In the embodiment of FIG. 2B, the system 400 includes a multiplexer 154 within the optical switch 440 and optically coupled between the plurality of pump filter modules 166a, 166b and the pump outlet 448. The multiplexer is arranged to combine the filtered pump lasers from the plurality of radiation sources 152a and 152b, which is sent to the pump outlets 448. The system 400 further includes a return multiplexer 158 within the optical switch 440 and optically coupled between the return inlet 449 and the return filter modules 168a, 168b. The return multiplexer 158 is arranged to separate return signals from the plurality of probes 110 via the return inlet 449 and send those separated signals to the return filter modules 168a, 168b, and the detectors 156a, 156b.

Although each of systems 100, 200, 300, and 400 are shown with two radiation sources 152a and 152b, embodiments of this disclosure are not limited to only two radiation sources. Thus, according to some embodiments, a Raman spectroscopy system can be provided that has two or more radiation sources, such as three, four, five, six, seven, eight, nine, ten, or more radiation sources. FIGS. 1A-2B are limited to showing only two radiation sources for the sake of simplicity. A person of ordinary skill in the art will understand how the aspects described herein can be applied to two or more radiation sources. The plurality of radiation sources can include radiation sources having different wavelengths from one or more of the other sources in the plurality of radiation sources.

In addition, although each of systems 100, 200, 300, and 400 is shown with a single box that represents the optical switch 140, 240, 340, and 440, respectively, the systems according to this disclosure can include multiple switches. For example, in some embodiments, the optical switch may include a pump optical switch disposed between the plurality of radiation sources 152a, 152b and the pump outlets 148, 248, 348, and 448, and may further include a return optical switch disposed between the return inlets 149, 249, 349, and 449 and the one or more detectors 156, 156a, 156b.

The plurality of radiation sources (e.g., 152a and 152b) as described herein may be, for example, a commercially available laser having an output wavelength from about 200 nm to about 1550 nm. The output wavelength may be in the ultra-violet region of the electromagnetic spectrum between about 200 nm and about 400 nm, for example about 244 nm, about 257 nm, about 266 nm, about 325 nm, or about 364 nm. The output wavelength may be in the visible region of the electromagnetic spectrum between about 400 nm and about 700 nm, for example about 457 nm, about 473 nm, about 488 nm, about 514 nm, about 532 nm, about 633 nm, or about 660 nm. The output wavelength may be in the near-infrared region of the electromagnetic spectrum between about 700 nm and about 1500 nm, for example about 785 nm, about 830 nm, about 980 nm, or about 1064 nm. For example, the at least one radiation source 152 as described herein may have an output wavelength of between about 400 nm and about 850 nm. It should be appreciated that the output wavelength of the at least one radiation source 152 may be selected based on the material being analyzed with the system 100, 200, 300, 400. For example, a relatively long wavelength such as about 850 nm may be more suitable for analyzing liquids which tend to fluoresce, whereas relatively shorter wavelengths such as about 660 nm or 785 nm may be more suitable for analyzing materials when higher efficiency of the Raman scattering process is desirable.

The choice of laser wavelength can impact the analysis in several ways, including impacting sensitivity, spatial resolution, and the characteristics of the samples being measured. For example, with respect to sensitivity, Raman scattering intensity is proportional to $\lambda^{-4}$, where $\lambda$ is the laser wavelength. Thus, an infra-red laser results in a decrease in scattering intensity by a factor of 10 or more compared with visible lasers. With respect to spatial resolution, the diffraction-limited laser spot diameter can be calculated according to the equation: $D=1.22\lambda/NA$, where D is the spot diameter, $\lambda$ is the laser wavelength, and NA is the numerical aperture of the lenses in the system. With respect to the characteristics of the sample being measured, wavelengths in the 400-600 nm range, for example, tend to be used for inorganic materials, resonance Raman, and surface enhanced Raman scattering (SERS), while wavelength in the red and near infra-red may be preferred for fluorescence suppression. Given these considerations, a system that enables the use of multiple lasers can provide flexibility with respect to sensitivity, spatial resolution, and the desired characteristics of the sample to be measured.

Another consideration and problem to be overcome in Raman spectroscopy is the suppression of luminescence (fluorescence and photoluminescence). Luminescence is a one-photon process, whereas Raman scattering is a two-photon process, so the probability of luminescence occurring is higher than that of Raman scattering. In general, only one Raman photon is generated for every 106 to 109 photons incident upon the sample, so even a small level of luminescent emission can overwhelm the Raman signal. To avoid the luminescence background and the noise that it produces, spectroscopists need to identify an excitation wavelength that does not induce photoluminescence in the sample. That is why it is desirable to make more than one laser wavelength available when measuring with a variety of materials. For example, if a measurement at a given wavelength produces too much luminescence, then shifting to a longer wavelength might improve the signal-to-noise ratio of the measurement. Thus, embodiments of this disclosure can make it easier for spectroscopists to overcome the challenges of luminescence.

According to some embodiments, when there is fluorescence in the sample, the use of multiple wavelengths (from multiple lasers or radiation sources) can also enable one to filter out Raman signals from the fluorescent background by sequentially using multiple excitation frequencies, as discussed, for example, in S. T. McCain, R. M. Willett, and D. J. Brady, "Multi-excitation Raman spectroscopy technique for fluorescence rejection," Optics Express vol. 16, pp. 10975-10991 (21 Jul. 2008). This filtering method exploits the shift of the Raman spectra with excitation frequency and the static response of the fluorescent background.

Figure 3:
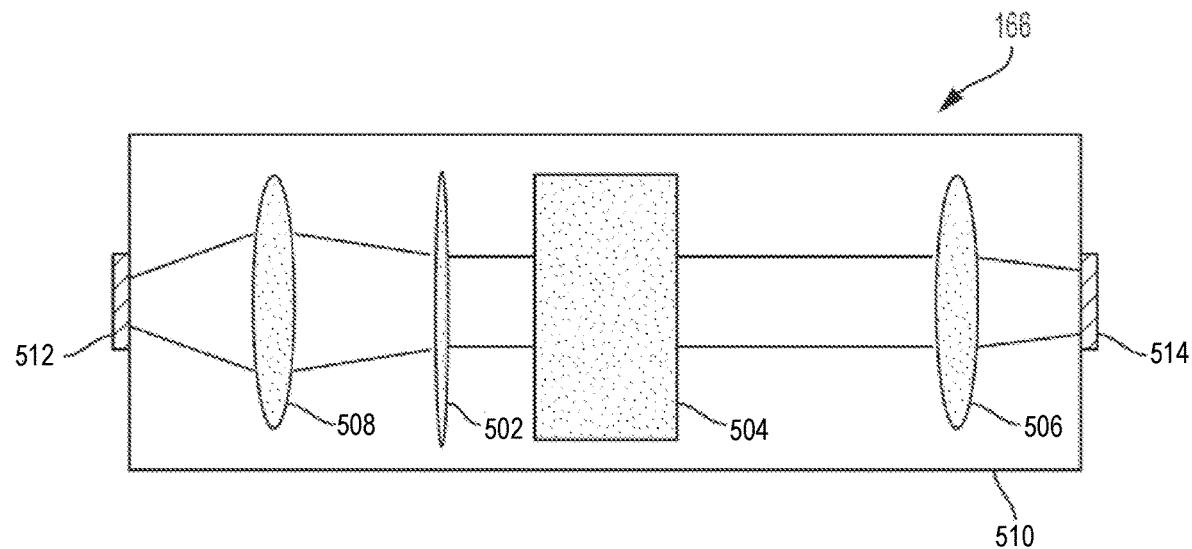
FIG. 3 illustrates a pump filter module in accordance with embodiments of the present disclosure.

FIG. 3 illustrates a pump filter module as described herein. According to embodiments of the present disclosure, the pump filter module 166 may include a housing 510 having an input 512 at a first end and an output 514 at a second end which is an opposite end of housing 510 as the first end. The housing input 512 may be optically coupled to the at least one radiation source 152a, 152b. In system 100 the housing output 514 may be optically coupled to the pump inlet 146 of optical switch 140, and optionally may be coupled to the pump multiplexer 154 disposed between the pump filter module 166 and the pump inlet 146. Similarly, in system 300, the housing output 514 may be optically coupled to the pump inlet 346 of optical switch 340, and optionally may be coupled to the pump multiplexer 154 disposed between the pump filter module 166 and the pump inlet 346. In system 200, the housing output 514 may be optically coupled to an optical connection within the optical switch 240 which delivers radiation in the direction of the plurality of pump outlets 148, optionally via the pump multiplexer 154 disposed between the pump filter module 166 and the pump outlets 148. Similarly, in system 400, the housing output 514 may be optically coupled to an optical connection within the optical switch 440 which delivers radiation in the direction of the plurality of pump outlets 448. Between the housing input 512 and the housing output 514, the pump filter module 166 includes a band-pass filter 504 positioned between a collimator 502 and a focusing lens 506. The band-pass filter 504 may be operable at any suitable wavelength matched to allow only the excitation wavelength to pass, but as an example is selected to allow only radiation with a 785 nm wavelength to pass through. The collimator 502 collimates the radiation before it enters the band-pass filter 504. After the band-pass filter 504, the focusing lens 506 focuses the radiation to the optical connection coupled to the housing outlet 514. Optionally, and as shown in FIG. 3, the pump filter module 166 may include a second focusing lens 508 positioned between the housing input 512 and the collimator 502. The second focusing lens 508 may be included to focus radiation from the at least one radiation source 152 to the collimator 502.

Figure 4:
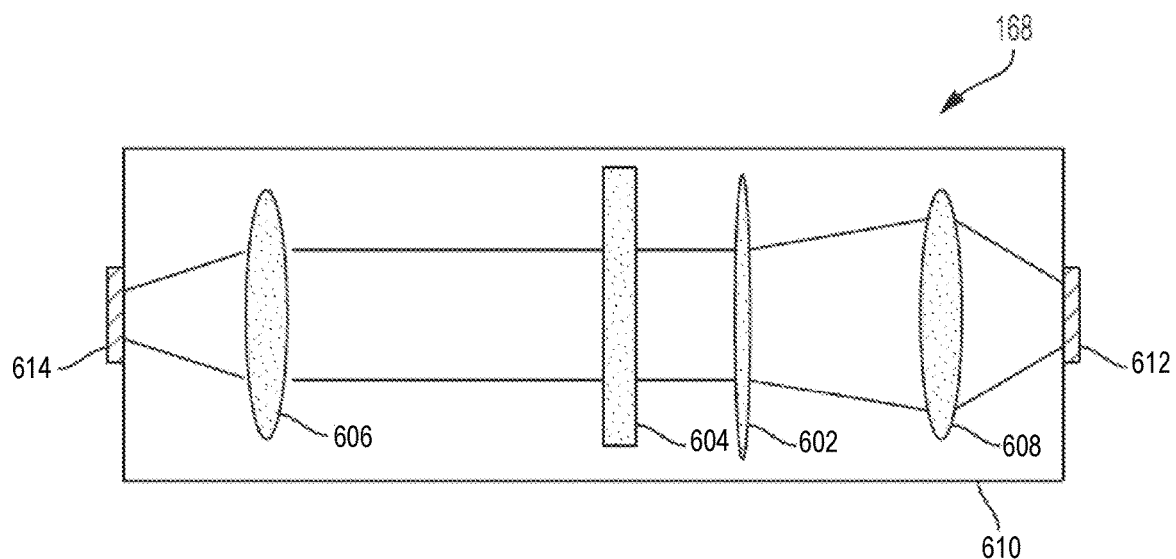
FIG. 4 illustrates a return filter module in accordance with embodiments of the present disclosure.

FIG. 4 illustrates a return filter module as described herein. According to embodiments of the present disclosure, the return filter module 168 may include a housing 610 having an input 612 at a first end and an output 614 at a second end which is an opposite end of housing 610 as the first end. The housing output 614 may be optically coupled to the detector 156 (156a, 156b). In system 100, the housing input 612 may be optically coupled to the return outlet 147 of optical switch 140. Similarly, in system 300, the housing input 612 may be optically coupled to the return outlet 347 of optical switch 340, and optionally may be coupled to the return multiplexer 158 disposed between the return filter module 168 (168a, 168b) and the return outlet 347. In system 200, the housing input 612 may be optically coupled to an optical connection within the optical switch 240 which delivers radiation from the plurality of return inlets 149. Similarly, in system 400, the housing input 612 may be optically coupled to an optical connection within the optical switch 440 which delivers radiation from the plurality of return inlets 449, and optionally may be coupled to the return multiplexer 158 disposed between the return filter module 168 (168a, 168b) and the plurality of return inlets 449. Between the housing input 612 and the housing output 614, the return filter module 168 includes a filter 604 positioned between a collimator 602 and a focusing lens 606. The filter 604 may be for example, but not limited to, an edge filter, a long-pass, or notch filter. Where the filter 604 is an edge filter or a long pass filter, the filter 604 is selected to block an excitation signal wavelength but allow radiation of longer or shorter wavelengths to pass through. Where the filter 604 is a notch filter, the filter 604 is selected to block an excitation signal wavelength but allow radiation at both longer and shorter wavelengths to pass through. As used herein, the term "excitation signal" refers to radiation delivered to the plurality of probes 110 by the at least one radiation source 152 and "excitation signal wavelength" refers to the wavelength of the radiation delivered to the plurality of probes 110 by the at least one radiation source 152. For example, where the at least one radiation source 152 delivers radiation having a wavelength of 785 nm, the long-pass filter is adapted to block radiation with a 785 nm wavelength from passing through. The collimator 602 collimates the radiation before the long-pass filter 604. After the long-pass filter 604, the focusing lens 606 focuses the radiation to the optical connection coupled to the housing outlet 614. Optionally, and as shown in FIG. 4, the return filter module 168 may include a second focusing lens 608 positioned between the housing input 612 and the collimator 602. The second focusing lens 608 may be included to focus radiation from the plurality of probes 110 to the collimator 602.

According to embodiments of the present disclosure, system 100, 200 operates to deliver radiation from the plurality of radiation sources 152a, 152b into the optical switch 140, 240 through the pump inlet 146. In response to a control signal from controller 160, the optical switch 140, 240 forms a connection between the pump inlet 146 and at least one of the plurality of pump outlets 148 such that radiation is delivered from the optical switch 140, 240 to at least one of the plurality of probes 110 through at least one excitation fiber 130. The plurality of probes 110 deliver radiation from the plurality of radiation sources 152a, 152b to a sample and radiation scattered by the sample is collected by the plurality of probes 110 and returned to the plurality of return inlets 149 of the optical switch 140, 240 through at least one emission fiber 132. In response to a control signal from controller 160, the optical switch 140, 240 forms a connection between at least one of the plurality of return inlets 149 and the return outlet 147 such that radiation is delivered from the optical switch 140, 240 to the detector 156.

According to embodiments of the present disclosure, system 300, 400 operates to deliver radiation from the plurality of radiation sources 152a, 152b into the optical switch 340, 440 through the pump inlet 346. In response to a control signal from controller 160, the optical switch 340, 440 forms a connection between the pump inlet 346 and at least one of the plurality of pump outlets 348 such that radiation is delivered from the optical switch 340, 440 to at least one of the plurality of probes 110 through at least one excitation fiber 130. The plurality of probes 110 deliver radiation from the plurality of radiation sources 152a, 152b to a sample and radiation scattered by the sample is collected by the plurality of probes 110 and returned to the plurality of return inlets 349 of optical switch 340, 440 through at least one emission fiber 132. In response to a control signal from controller 160, the optical switch 340, 440 forms a connection between at least one of the plurality of return inlets 349 and the return outlet 347 such that radiation is delivered from the optical switch 340, 440 to the detector 156.

The optical switch 140, 240, 340, 440 as described herein may be any optical switch known in the art. For example, the optical switch 140, 240, 340, 440 may be a mechanical optical switch such as is described in U.S. Pat. Nos. 4,239,330, 4,239,331, 4,322,126, and 4,303,303, the contents of which are incorporated herein by reference in their entirety. Optionally, the optical switch 140, 240, 340, 440 may be a multiple optical fiber electromechanical switch such as is described in U.S. Pat. No. 4,634,239 the contents of which are incorporated herein by reference in its entirety. Optionally, the optical switch 140, 240, 340, 440 may be a refractive element optical transmission switch such as is described in U.S. Pat. No. 5,361,315, the contents of which are incorporated herein by reference in its entirety.

For example, in some embodiments, the switch may include a mechanical wheel having a number of short lengths of pump and return optical fibers. These short lengths of pump and return fibers may be arranged in an alternating pattern or in groupings around the perimeter of the wheel, and a pair, or more, of these short lengths of pump and return fibers can be coupled to pump and return fibers that carry signals from/to the laser/detector of the Raman spectrometer. As an aspect of some embodiments, a Raman spectroscopy system can include two return fibers or return fiber bundles connecting the switch to the Raman probe assembly. For example, the sample end of the Raman probe assembly can include a single pump fiber surrounded by a plurality of receive fibers. In some specific embodiments, for example, the pump fiber can have a core diameter of 105 µm and a cladding diameter of 125 µm, or a core diameter of 200 µm and a cladding diameter of 225 µm. The numerical aperture (NA) of the pump fiber can be about 0.22.

In a further example of an aspect of some embodiments, the pump fiber is surrounded by 14 receive fibers having core and cladding diameters of 100 and 120 µm, respectively. In this example, the pump fiber has core and cladding diameters of 200 and 225 µm, respectively, and a coating diameter of about 440 µm. The receive fibers have core and cladding diameters of 100 and 120 µm, respectively, and the coating has been removed. The fiber bundle can be fixed into an SMA 905 ferrule having an inside diameter of about 700 µm. At the end of the Raman probe that connects to the optical switch, the fiber bundle shown can be furcated into one branch with the single pump fiber and two branches which each incorporate seven of the receive fibers into a bundle. The pump fiber may be terminated with FC/AC or and SMA-905 connectors, for example, while the receive fiber bundles may be terminated with SMA 905 connectors having inside diameters of about 380 µm.

The receive fiber bundle SMA connector can attach to a second SMA connector on an outside port of the switch. The receive fiber positions inside the switch are comprised of fibers having core diameters from about 350 to about 400 µm, which ensures that a higher percentage of the light carried by the seven fibers in each bundle is coupled into the switch. The two jumpers connecting the output side of the switch to the detector of the spectrometer can have "round-to-linear" configurations in which the two "round" groups of seven probe fibers are arrayed in a linear configuration of 14 fibers in an SMA 905 connector that is aligned with the detector slit. These jumpers differ from commercially available products in that two round fiber bundles are merged to create the linear array at the detector.

Embodiments of the present disclosure may include a plurality of probes 110 each having an optical head assembly 112 configured to direct excitation radiation to a sample and to collect radiation scattered by the sample. The optical head assembly 112 is optically connected to at least one excitation fiber 130 through which an excitation signal is directed from the plurality of radiation sources 152a, 152b. The optical head assembly 112 is further optically connected to at least one emission fiber 132. Radiation scattered by a sample in response to the excitation signal is collected at the optical head assembly 112 and delivered to the at least one emission fiber 132.

According to embodiments of the present disclosure, the optical head assembly 112 may include an input and an output separate from the input. The at least one excitation fiber 130 may be optically connected to the input of the optical head assembly 112 by, for example, an optical fiber connector, and the at least one emission fiber 132 may be optically connected to the output of the optical head assembly 112 by, for example, an optical fiber connector. Alternatively, the optical head assembly 112 may include a port optically connected to an optical fiber bundle. The optical fiber bundle may be optically coupled to the port of the optical head assembly 112 by, for example, an optical fiber connector. As one example, the optical fiber bundle may include one or more excitation fibers 130 and a plurality of emission fibers 132 around the circumference of the one or more excitation fibers 130.

It is generally understood that the greater the number of emission fibers 132 within the optical fiber bundle the greater the amount of scattered radiation that can be communicated from the plurality of probes 110 to the detector 156. While the optical fiber bundle described herein may include any number of emission fibers 132, the optical fiber bundle as described herein may include two or more emission fibers 132, for example, between about 2 and about 10 emission fibers 132, or between about 3 and about 8 emission fibers 132 and all values therebetween. Furthermore, the amount of scattered radiation that can be communicated from the plurality of probes 110 to the detector 156 decreases as the separation between the fibers of the optical fiber bundle is increased. Thus, the optical fiber bundle as described herein includes a configuration which minimizes spacing between the fibers in the optical fiber bundle. For example, the ends of the fibers where the optical fiber connects to the optical head assembly 112 may be in direct contact with each other.

According to embodiments of this disclosure, the filters that are commonly located in the Raman probe assemblies can be relocated into the pump and receive filter modules located between the switch and the spectrometer, or they can be relocated into the switch itself. The advantages of the embodiments of this disclosure include significant cost savings. For example, N pairs of filters, which can cost approximately $1000 (USD) per pair, that would have been incorporated into N Raman probes can be reduced to fewer filter modules, or even a single pair of filter modules. In a system with 150 measurement locations, for example, this can result in cost savings of around $150,000 (USD).

As discussed above, embodiments of this disclosure include using two or more radiation sources or lasers that are coupled to a plurality of samples via an optical switch. Multiplexers are used to combine the two filtered pump lasers into a single pump fiber (which can be incorporated into a fiber bundle) that is optically coupled to the sample through the switch. Only one of the pump fibers exiting the switch may be "live" for a given measurement. This approach can be extended for coupling three, four, or more lasers to each of the samples being measured.

In accordance with embodiments of the present disclosure, the system 100, 200, 300, 400 may include a detector 156 or a plurality of detectors 156a, 156b. The detector(s) 156 (156a, 156b) may be optically connected, through the filter module 168, to a return outlet 147, 347 to enable scattered radiation from the sample to be transmitted onto a slit of the detector 156. The detector(s) 156 (156a, 156b) may be a charged coupled device (CCD) based sensor that quantizes and outputs the spectral data as an array of intensities at different wavelengths. Other exemplary detectors may include Focal Plane Array detectors such as a Complementary Metal Oxide Semiconductor (CMOS) detector, and Photodiode Array detectors such as an Si detector and an InGaAs detector.

The use of multiple detectors in conjunction with the optical switch allows for measuring multiple samples with lasers operating in different spectral ranges, such as visible and near-infrared, for example. Aspects of embodiments can also implement different filters for the return fibers. For example, one return filter module could have a long-pass filter to capture the Stokes-shifted Raman light, while the other could incorporate a notch filter to capture both the Stokes and anti-Stokes components.

In accordance with embodiments of the present disclosure, the system 100, 200, 300, 400 may further include a controller 160 configured to provide an interface for connecting the various components of the system 100, 200, 300, 400 to a computing system, such as a personal computer. The controller 160 may be configured to control the operation of the various components of the system 100, 200, 300, 400. For example, in system 100, 200, the controller 160 is configured to control the optical switch 140, 240 or in system 300, 400 the controller is configured to control the optical switch 340, 440. Controller 160 communicates a control signal 138a to an embedded computer of optical switch 140, 240, 340, 440 specifying at least one excitation fiber 130 through which radiation is to be delivered. In response to the control signal 138a, the optical switch 140, 240, 340, 440 forms a connection between the pump inlet 146, 346, 446 and at least one of the plurality of pump outlets 148, 348, 448 such that radiation is delivered from the optical switch 140, 240, 340, 440 to at least one of the plurality of probes 110 through at least one excitation fiber 130. Similarly, controller 160 communicates a control signal 138a to an embedded computer of optical switch 140, 240, 340, 440 specifying at least one emission fiber 132 from which scattered radiation is to be delivered. In response to the control signal 138a, the optical switch 140, 240, 340, 440 forms a connection between at least one of the plurality of return inlets 149, 349, 449 and the return outlet 147, 347, 447 such that radiation is delivered from the optical switch 140, 240, 340, 440 to a detector 156, 156a, 156b.

For example, the controller 160 may be configured to control, through control signal 138c, the plurality of radiation sources 152a, 152b to turn on and off one or more radiation sources 152a, 152b, as well as to control the output power of the plurality of radiation sources 152a, 152b. The controller 160 may also be configured to control, through control signal 138b, the power to the detector 156, 156a, 156b to turn the detector on and off and to read Raman spectra data as well as to receive the spectra data signals. Additionally, the controller 160 may transmit control signals 138b to the detector 156, 156a, 156b to forward Raman spectra data to a computing system for further processing and analysis. The optical switch 140, 240, 340, 440, the plurality of radiation sources 152a, 152b, and/or the detector 156, 156a, 156b may be directly coupled to the controller 160 through a wired interface, such as Universal Serial Bus (USB), Firewire, serial (RS232) or parallel interface, or may be coupled to the controller 160 through a wireless interface, such as Wi-Fi, Blue Tooth, or ZigBee.

The controller 160 can be a dedicated device based upon an application specific integrated circuit (ASIC), programmable array or programmable micro controller. Alternatively, the controller 160 can be an interface which controls and converts signals for transfer between the components of the system and the computing system. The controller 160 can include analog to digital conversion functions to convert Raman spectra signals from the detector 156 to digital data signals transferred to the computing system.

The computing system 170 can include a CPU or processor and associated memory, including RAM, ROM, volatile and non-volatile memory for storing and executing programs and storing data. The computing system 170 can include programs for reading in, storing and displaying Raman spectra data received from the detector 156, performing analysis and processing of the Raman spectra data and for comparing the received Raman spectra data with stored Raman spectra data. The Raman spectra data can be displayed in the form of graphs and tables.

While the present disclosure includes a limited number of embodiments, those skilled in the art, having benefit of this disclosure, will appreciate that other embodiments can be devised which do not depart from the scope of the present disclosure.

What is claimed is:

1. A Raman spectroscopy system comprising:
an optical switch comprising a pump inlet, a return outlet, a plurality of pump outlets, and a plurality of return inlets;
a plurality of radiation sources optically coupled to the pump inlet of the optical switch;
a detector optically coupled to the return outlet of the optical switch;
a plurality of probes, each probe optically connected to at least one of the plurality of pump outlets of the optical switch by at least one excitation fiber and optically coupled to one of the return inlets of the optical switch by at least one emission fiber;
a plurality of pump filter modules optically coupled between the plurality of radiation sources and the pump outlets of the optical switch; and
a pump multiplexer optically coupled between the plurality of pump filter modules and the plurality of pump outlets of the optical switch.

2. The spectroscopy system of claim 1, further comprising a return filter module optically coupled between the detector and the return inlets of the optical switch.

3. The spectroscopy system of claim 1, wherein the optical switch comprises a pump optical switch and a return optical switch, wherein the pump optical switch comprises the pump inlet and the plurality of pump outlets, and wherein the return optical switch comprises the plurality of return inlets and the return outlet.

4. The spectroscopy system of claim 1, wherein the plurality of pump filter modules comprises a housing disposed between the plurality of radiation sources and the pump inlet of the optical switch.

5. The spectroscopy system of claim 2, wherein the return filter module comprises a housing disposed between the detector and the return outlet of the optical switch.

6. The spectroscopy system of claim 1, wherein each pump filter modules of the plurality of pump filter modules is optically coupled to one of the plurality of radiation sources between the plurality of radiation sources and the plurality of pump outlets of the optical switch.

7. The spectroscopy system of claim 1, wherein the plurality of radiation sources comprises a plurality of lasers.

8. The spectroscopy system of claim 1, wherein the plurality of pump filter modules comprises a band-pass filter disposed between a collimator and a focusing lens.

9. The spectroscopy system of claim 2, wherein the return filter module comprises a filter disposed between a collimator and a focusing lens.

10. The spectroscopy system of claim 2, further comprising a plurality of return filter modules optically coupled between the detector and the return inlets of the optical switch.

11. The spectroscopy system of claim 10, further comprising a return multiplexer optically coupled between the return outlet and the plurality of return filter modules.

12. The spectroscopy system of claim 10, wherein the plurality of return filter modules comprises a first return filter module and a second return filter module, the first return filter module comprising at least one of a long-pass filter, a notch filter, and an edge filter, and the second return filter module comprising at least one of a long- pass filter, a notch filter, and an edge filter.

13. The spectroscopy system of claim 10, further comprising a plurality of detectors optically coupled to the plurality of return filter modules.

14. The spectroscopy system of claim 1, comprising an optical fiber bundle having a plurality of the emission fibers around the circumference of the at least one excitation fiber.

15. The spectroscopy system of claim 1, further comprising a controller.

16. The spectroscopy system of claim 1, wherein the system is configured to analyze, via the plurality of probes, one or more samples at a plurality of locations using at least one of the plurality of radiation sources.

17. The spectroscopy system of claim 1, wherein the system is configured to perform Raman spectroscopy of a sample using two or more of the plurality of radiation sources.

* * * * *